United States Patent [19]
Pott

[11] 3,949,866
[45] Apr. 13, 1976

[54] CONVEYER SCRAPER WITH CONTINUOUSLY APPLIED CONSTANT SURFACE PRESSURE

[75] Inventor: Richard Pott, Lage-Heiden, Germany

[73] Assignee: Contico Industries Ltd., Edmonton, Canada

[22] Filed: Aug. 20, 1974

[21] Appl. No.: 498,957

[30] Foreign Application Priority Data
Sept. 3, 1973  Germany........................... 2344409

[52] U.S. Cl. ............................................. 198/230
[51] Int. Cl.² .......................................... B65G 45/00
[58] Field of Search .......... 198/229, 230, 188, 208, 198/231, 185, 66; 193/2 R

[56] References Cited
UNITED STATES PATENTS

| | | | |
|---|---|---|---|
| 3,101,837 | 8/1963 | Martin | 198/230 |
| 3,722,667 | 3/1973 | Olson | 198/230 |
| 3,782,534 | 1/1974 | Holleman | 198/230 |

Primary Examiner—Robert J. Spar
Assistant Examiner—James M. Slattery
Attorney, Agent, or Firm—E. P. Johnson

[57] ABSTRACT

A rubber scraper is slidably received in a guide frame. A horizontal cross member supports the bottom edge of the scraper. Counterweight assemblies are attached to the ends of the cross member and function to raise the scraper through the frame toward the underside of the conveyor belt to be scraped. The counterweight assemblies each include a counterweight running in a downwardly curved guide so that, as the weight of the scraper diminishes due to wear, friction and the support of the curved guide acting on the weight gradually decreases the force with which the counterweight pulls on the cross member, thereby ensuring that the scraper applies a generally constant pressure against the belt.

4 Claims, 7 Drawing Figures

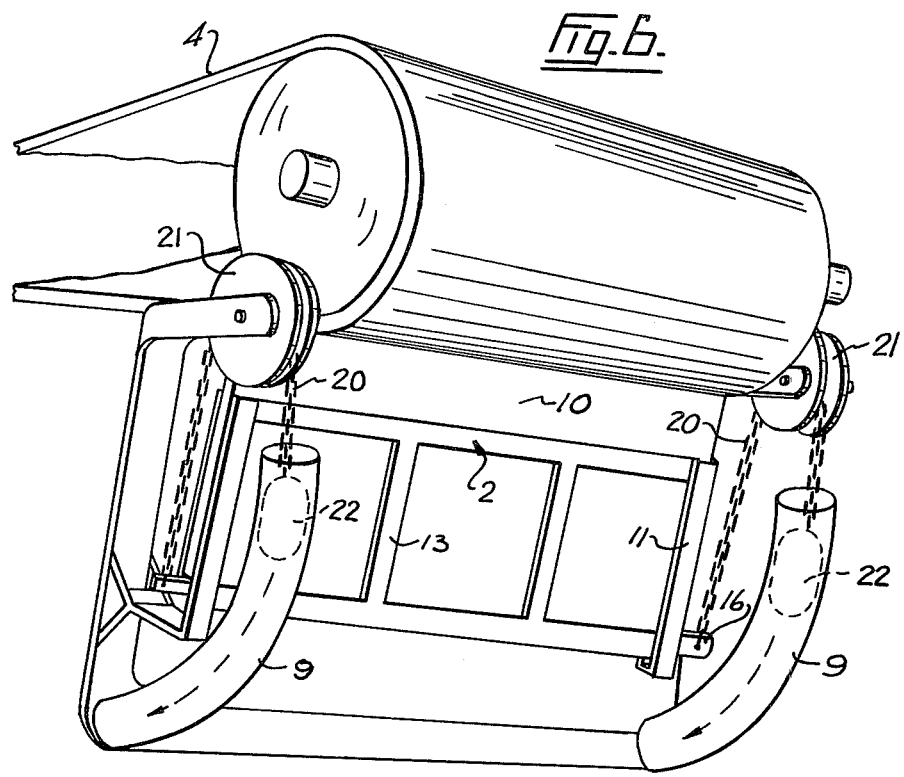
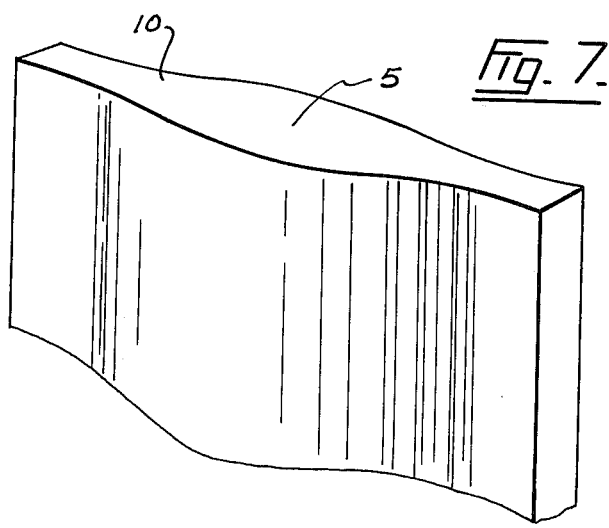

CONVEYER SCRAPER WITH CONTINUOUSLY APPLIED CONSTANT SURFACE PRESSURE

BACKGROUND OF THE INVENTION

The invention relates to a conveyor-belt scraper device having means for maintaining constant surface pressure of the scraper on the conveyor belt.

Known scraper devices usually involve a flat-iron-bar mounting, with a scraper made of rubber or some other elastomer clamped therebetween, the scraper material being pressed against the conveyor belt by means of counterweights secured to a swingably suspended lever arm. When the scraper material has reached a certain degree of wear, and there is a danger of the conveyor belt being damaged by the flat iron bars of the scraper mounting, the clamping screws of the said mounting must be loosened and the remaining scraper material must be adjusted upwardly within the mounting. Since only a relatively small volume of scraper material is available, it is not long before the entire scraper has to be replaced, since there is not enough scraper material left to clamp in the mounting. The fitting of a new scraper to the mounting requires a considerable amount of labor, since the entire scraper device must be removed and dismantled, new scraper material must be cut to fit, and the whole must be re-installed. The use of a much wider, and therefore heavier, strip of scraper material, instead of the relatively narrow strip prescribed, has the disadvantage that the decrease in weight brought about by wear of the scraper material causes the surface pressure induced by the counterweights to increase quickly, the scraping action and wear of the scraper being thus uncontrollably and negatively affected.

SUMMARY OF THE INVENTION

The purpose of the invention is therefore to produce a scraper device in which the pressure applied by the scraper to the conveyor belt is substantially constant throughout the life of the scraper, thus ensuring constant rate of wear over all of the scraper material. Preferably, the scraper is accommodated in the scraper device in the form of a sheet and without a secured mounting. The constant pressure feature leads to an increase in the life, reliability and economic efficiency of the scraper. The provision of a scraper sheet which can be slipped in or out of its mounting frame substantially reduces the operating costs of the relevant conveyor device, from the point of view of maintenance costs and the cost to procure a scraper material.

DESCRIPTION OF THE DRAWINGS

In the drawing attached hereto:

FIG. 5 is a side elevation of the feed cross member;

FIG. 6 is a perspective view of the device in operation; and

FIG. 7 is a perspective view of a preferred form of scaper.

DESCRIPTION OF THE PREFERRED EMBODIMENT

Figure 1:
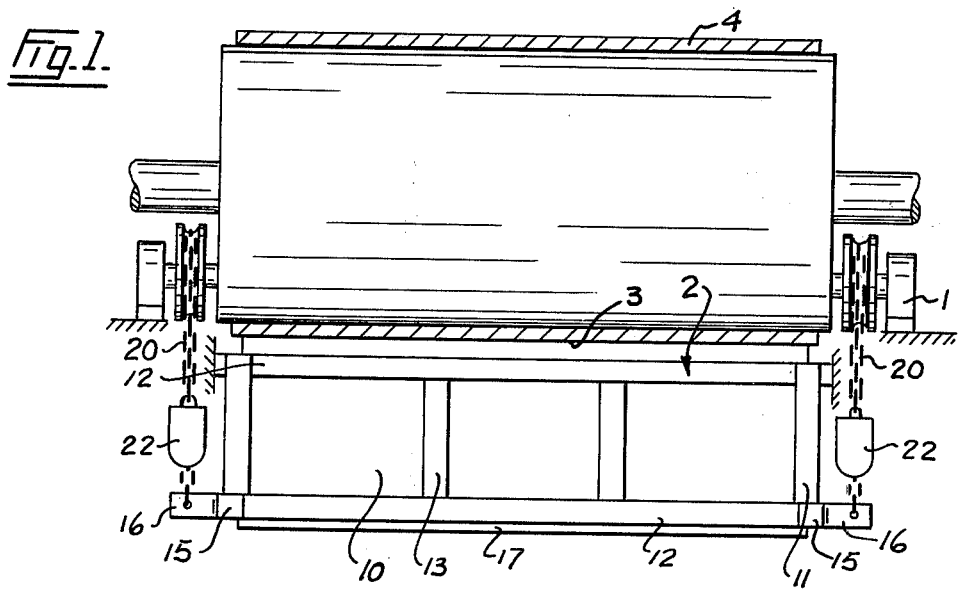
FIG. 1 shows the back of a portion of the scraper device.

The scraper device comprises a support member 1 from which the remaining parts are suspended.

A stationary frame 2 is provided to slidably receive the scraper 10 and to guide it toward the underside 3 of the conveyor belt 4 to be scraped. The frame 2 is formed of laterally arranged U-sections 11 connected together at the top on both sides and at the bottom at the back only by cross members 12. The cross members 12 are braced by cross pieces 13.

A scraper 10 of rectangular configuration is loosely held in the frame 2. The scraper 10 is generally flat but has a thickened central portion 5 to provide extra wear capacity in the area where the concave belt 4 will bear down with the greatest force. It will be noted that the upper portion of the scraper 10 projects well above the upper edge of the frame 2, so that the belt will not contact the latter.

As is conventional, the scraper will be formed of a material having substantial stiffness but which does not deleteriously abrade the belt. One such preferred material is hard rubber.

A feed cross member 6 supports the scraper 10 along its bottom edge. This cross member 6 comprises an angle section 14 to which U-shaped guide yokes 15 are attached. The yokes 15 loosely enclose the three sides of U-sections 11, thus guiding the frame 2. The yokes 15 terminate in lugs 16. Angle section 14 has a leg 17 which extends horizontally, while the guide yokes 15 are attached to the upwardly projecting leg 18, which is somewhat shorter than the distance between the U-sections 11. Since the U-sections are rigidly connected together at the lower ends on the back only, leg 18 may move between the U-sections 11, thus raising the scraper 10 which rests on leg 17.

A counterweight assembly is connected to each side of the support member 1 and functions to raise the feed cross member 6 to press the scraper 10 against the belt 4. More particularly, a counterweight 22 is suspended from a chain 20 which passes over a pulley 21, rotatably mounted on the support member 1 above the scraper 10; the chain is attached at its lower end to a cross member lug 16. The counterweight 22 runs in a downwardly curved guide 9.

The size of the counterweight 22 is determined by the rate of the scraper material the weight of the feed cross member, and the pressure which the scraper is required to exert on the conveyor belt.

Figure 2:
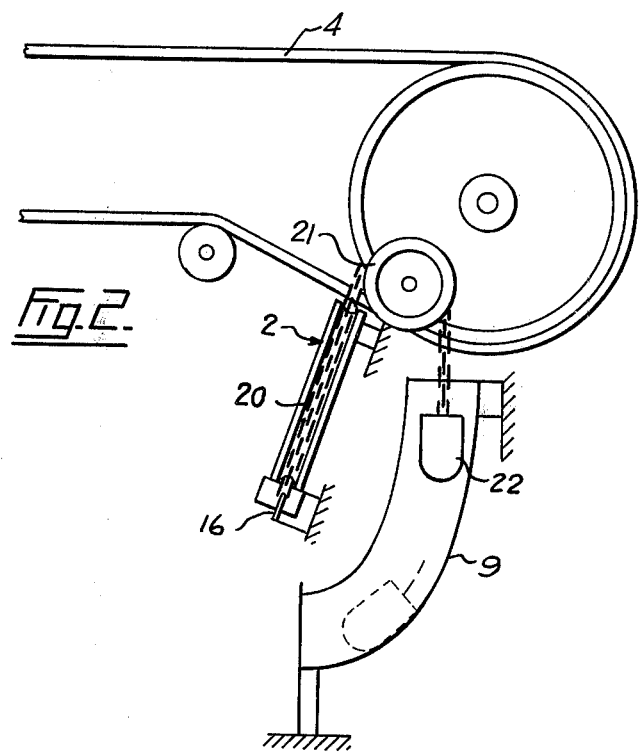
FIG. 2 is a side elevation of the embodiment of FIG. 1.
Figure 3:
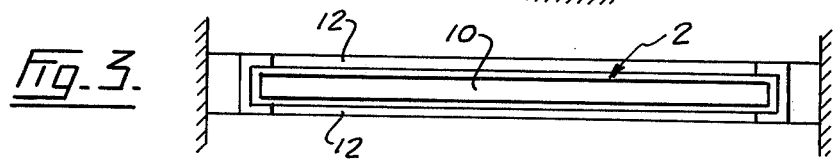
FIG. 3 is a plan view of the scraper guide frame.
Figure 4:
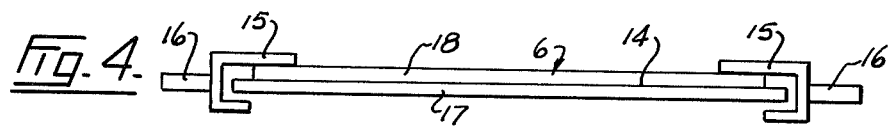
FIG. 4 is a plan view of the feed cross member which raises the scraper.

As the weight of the scraper 10 decreases as a result of wear, the force applied by the counterweights 22 is also reduced, in conformity with the triangle of forces, by the location of the counterweight in the guide 9. The loss of weight by the scraper is thus compensated for and the pressure is kept constant, the actual weight of the counterweight 22, as illustrated in FIG. 2, being broken down into a bearing force and a motion force. Reduction of the scraper weight is compensated for by an appropriate deflection of the counterweights 22 in the guides 9, and the pressure of the scraper 10 on the conveyor belt 4 is thus kept constant.

In operation, the counterweight 22 exerts a downward force on the chain 20 which acts to raise the cross member 6 and thus press the scraper 10 against the belt 4.

Almost all of the length of the scraper 10 can be utilized for scraping without having to adjust it in any way. When almost worn out, it can easily and quickly be replaced.

What is claimed is:

1. A device for scraping a conveyor belt comprising:
   a support member;
   a scraper;
   means for suspending the scraper from the support member in close proximity to the underside of the conveyor belt; and
   means for raising the suspending means toward the conveyor belt to bring the scraping edge of the scraper into contact with the belt and to press it thereagainst with substantially constant force,
   said raising means comprising
   a counterweight, attached to said suspending means for raising it by exerting a downward force thereon,
   and a curved guide means slidably receiving the counterweight whereby the downward force gradually diminishes as the counterweight moves along the guide means.

2. The device as set forth in claim 1 wherein:
   the scraper has side portions of substantially uniform thickness and a relatively thicker central portion.

3. A device for scraping a conveyor belt comprising:
   a support member;
   a scraper;
   a frame, suspended from the support member in close proximity to the underside of the conveyor belt;
   said scraper being guided toward the belt by the frame;
   means supporting the scraper within the frame;
   a rotatable member suspended from the support member above the base of the scraper;
   a counterweight;
   a connecting member attached at one end to the supporting means and extending over the rotatable member, said connecting member being attached at its inner end to the counterweight;
   and curved guide means slidably receiving the counterweight whereby the upward pull on the supporting means gradually diminishes as the counterweight moves downwardly along the guide means.

4. The device as set forth in claim 3 wherein:
   the scraper has side portions of substantially uniform thickness and a relatively thicker central portion.

* * * * *